United States Patent [19]

Marcoux et al.

[11] 3,742,584
[45] July 3, 1973

[54] METHOD OF INSTALLING TAPERED FASTENERS HAVING A HIGH PERCENT OF CONTACT SURFACE

[75] Inventors: Arthur Marcoux, Hermosa Beach, John H. Stansbury, Los Alamitas, both of Calif.

[73] Assignee: McDonnell Douglas Coropration, Santa Monica, Calif.

[22] Filed: July 27, 1972

[21] Appl. No.: 275,762

[52] U.S. Cl.................. 29/407, 29/426, 264/40, 287/189.36 D, 408/1
[51] Int. Cl............................................ B23q 17/00
[58] Field of Search .............. 29/407, 426; 408/1; 264/40; 287/189.36 D

[56] References Cited
UNITED STATES PATENTS

| | | | |
|---|---|---|---|
| 3,027,632 | 4/1962 | Baynes et al.................. | 29/407 |
| 3,158,045 | 11/1964 | Siler............................. | 408/1 X |
| 3,391,449 | 7/1968 | Briles......................... | 287/189.36 D X |
| 3,680,429 | 8/1972 | Briles......................... | 287/189.36 D X |

Primary Examiner—Charles W. Lanham
Assistant Examiner—D. C. Reiley, III
Attorney—Walter J. Jason, Robert O. Richardson et al.

[57] ABSTRACT

Manufacturing tools and method of making connections between structural members by fitting tapered fasteners into tapered holes with an extremely high percent of contact surface for fatigue resistance and long-life reliability.

5 Claims, 14 Drawing Figures

METHOD OF INSTALLING TAPERED FASTENERS HAVING A HIGH PERCENT OF CONTACT SURFACE

BACKGROUND OF THE PRESENT INVENTION

With the new aircraft age of wide-body, large passenger capacity aircraft, long-life reliability requirements beyond those provided by the present state of the art are demanded. The high cost of aircraft and the large passenger capacity demand a long-life reliability and a high resistance to fatique factor. High strength materials are used which are extremely hard to cut, drill and fasten together. The fastening of relatively thin sheets of material may be done by rivets which provide such a force-fit internally that the connection is leak-proof even upon shearing off the external heads. However, as thicker parts are fastened together, the lateral squeezing of the rivet material into the walls of the drill hole cannot be accomplished. The drilling of a cylindrical hole and the insertion of a cylindrical bolt would seem to be the obvious answer in the fastening together of thicker structural members. However, with such a procedure, it is practically impossible to provide for a high percent of surface contact between the bolt's outer surface and the surface of the walls of the holes and therefore, larger holes and bolts are required. This adds to the weight which is a penalty in its use.

In one model of tri-jet aircraft, 3,000 fastners are required between the wing root and the center wing box, and 10,000 fasteners are required between the wing skin and the spar attachments. Thus, each fastener must be as light as possible and yet provide the fastening function required of it. It has been found that the use of tapered bolts in tapered holes will provide maximum contact surface between the bolt and the hole and thus permit the desired weight reduction. In those applications calling for the present invention, there must be a minimum of 85 percent bearing contact between the bolt surface and the hole walls and in some cases, this bearing minimum has been increased to 90 percent and 95 percent. Any technique of manufacturing which will consistently produce this high percentage of bearing contact, because of the expense involved, must perform within a 95 to 99 percent acceptability on inspection and provision must be made for the re-working of those holes and fastners that do not meet these standards so that upon re-work they will, and thus avoid the complete rejection of the parts involved.

SUMMARY OF THE PRESENT INVENTION

In accordance with the present invention, a number of devices and techniques have been developed for the fastening together of a pair of aircraft structural parts by means of a tapered bolt through aligned tapered holes. This involves an initial step of determining the low side of a part of non-uniform thickness for orienting a drill bushing in a template or drill bar. This bushing is then connected with a drilling device having a sensing sleeve which then regulates the depth of ahole or the countersink configuration for engaging the bolt countersink head. A pilot drill hole is then made with a uniform diameter wall. Thereafter, the hole is tapered and countersunk, cleaned and checked for proper configuration. Reaming and burnishing operations are performed as required followed by depth testing of the countersink portion of the hole. The bolt is then inserted under light pressure and the bolt head protrusion above the outer surface is measured to ensure proper penetration when driven into the hole. Thereafter, a centering device is used to ensure aligned driving of the bolt into the hole. In the event re-working is required, proper procedures are set forth for the removal of the bolt and enlargement of the hole for an oversized bolt when needed.

Tapered fasteners made by the above method feature a greatly increased structural joint fatique life, and a savings in weight through structural thickness, fastener size and pattern density. These fasteners are self contained, self locking, and self sealing, and are faster hence cheaper to install.

BRIEF DESCRIPTION OF THE DRAWINGS

The various views show in perspective and partly in section, various tools to illustrate the various steps required in the performance of the present invention.

DETAILED DESCRIPTION OF ILLUSTRATIVE EMBODIMENT

Figure 1:
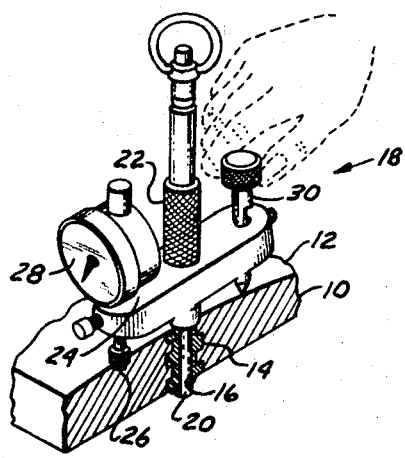
FIG. 1 shows a slope indicator and marking pin.

The fastening system of the present invention is used in highly stressed and thick sections and fatique critical structural members. This system comprises a tapered conical shank bolt, a companion washer nut for flat surfaces or a self-aligning washer and nut assembly for tapered surfaces and a close-tolerance tapered hole through the parts to be fastened. In providing for accuracy in assembly line drilling operations, it is customary to have a template or drill bar with drill bushings embedded therein for positioning over a work part and for the passage of cutting instruments such as drills through the drill bushings and into the work part. Naturally to do this, the template or drill bar must first be made. This first calls for the making of a master plaster pattern such as shown as 10 in FIG. 1. This pattern of the work part may be of a non-uniform thickness and may have a tapered or irregular upper surface 12. Within this master pattern 10 is embedded a bushing 14 with a bore 16 extending therethrough to represent the hole to be duplicated on work parts on the production line. As will be explained with reference to FIG. 3, a drill bushing in a drill bar must be indexed with the wide slot aligned or pointing in the direction of the lowest point of any incline of the top surface. This low point must first be determined.

This slope indicator and marker 18 includes a ball lock stem 20 insertable in the bore 16 of bushing 14 of the master pattern 10. This knurled nut 22 is turned until base 24 is firmly seated. This base 24 is rotatably mounted over stem 20 and has a surface contact bearing 26 which rolls over this surface 12 of the master pattern 10. As it rotates, it follows the surface and causes the base 24 to move vertically up or down on the stem 20. This vertical movement may be observed by means of dial gauge 28. When the direction of the lowermost surface has been observed a hand indicator 30 is used to make the proper indication on the surface 12. In this manner the low side can be determined and marked. The next step is to embed a drill bushing liner in a drill bar with its wide locking ear at all drilling, countersinking and guaging will be in reference to this low point so that at no time will the countersink head of a bolt protrude above the surface of a production part.

Figure 2:
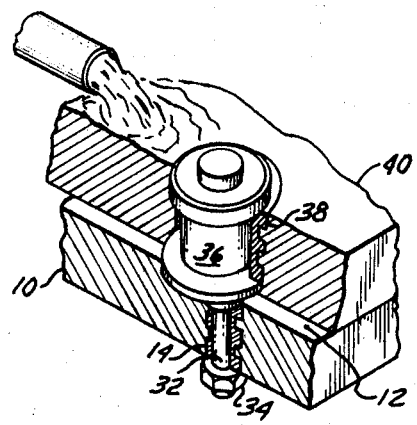
FIG. 2 shows the placement of a bushing in a spool around which is placed glass laminate in the making of a master drill bar.

After locating and scribing the slope direction on the pattern 10, the installation of a drill bushing in the laminate or drill bar may be done, as shown in FIG. 2. Here a bolt 32 is positioned within bushing 14 in pattern 10 and secured by a nut 34. On this bolt is rotatably mounted an indexing spool 36 consisting of upper and lower plates and a center section within the drill bushing liner 38 which is to be potted or laminated in a drill bar. Drill bushing liner 38 is first rotated to align the slot therein (not shown) with the low side of surface 12 of pattern 10, and thereafter the drill bar 40 may be fabricated around the drill bushing 38. Although the drill bar 40 in this illustration is a glass laminate, it could also be made of a solid substance such as metal with an enlarged hole to permit its positioning over the drill bushing and then an appropriate potting compound poured into the enlarged liner 38 holes around to make it an integral part of the drill bar.

Figure 3:
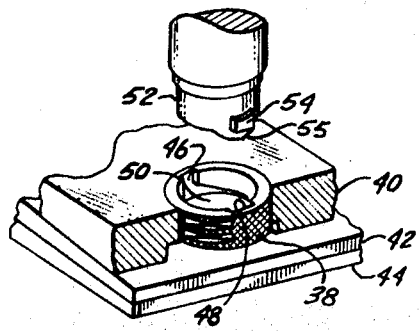
FIG. 3 shows the cooperation between the workpiece drill bar with drill bushing therein and the drill apparatus positioned thereover.

FIG. 3 represents the Drill Bushing System which is set forth more fully in copending U.S. Pat. application No. 231,258 filed March 2, 1972. Briefly, two workpieces 42 and 44 are positioned under the drill bar 40 and secured relative thereto. Drill bushing liner 38 within drill bar 40 has a pair of keyed slots 46, 48 diametrically opposed within the opening 50 of the drill bushing liner. Slot 48 is wider than slot 46 and has been indexed to the low side of the surface of workpiece 42. A drilling apparatus adapter 52 has ears 54 thereon which pass through these slots and rotate to be locked in position. As more fully set forth in the refered-to copending patent application, there is a depth sensing apparatus 55 which passes down from adapter 52 with the drill bit through the opening 50 of drill bushing 38 to control the drill depth relative to the low side of the surface of workpiece 42.

Figure 4:
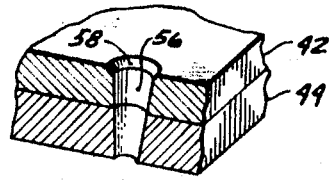
FIG. 4 shows a tapered countersunk hole.

In FIG. 4 there is shown a hole 56 that has been drilled through workpieces 42 and 44 for the purpose of inserting a fastneing device to secure the two parts together. This hole has tapered walls and a countersink portion 56 in workpiece 42 to accomodate a flush head type bolt. This hole 56 is made by first drilling a pilot hole of cylindrical shape and thereafter enlarging it and providing the taper and countersink configuration with the appropriate drilling tools.

Figure 5:
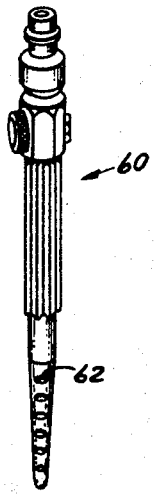
FIG. 5 shows the instrument for cleaning of the hole of coolant residual and metal chips preparatory to the probing or gaging.

In FIG. 5 is shown an air cleaner 60 having an upper end adapted for connection to a source of air pressure. This air cleaner has a plurality of holes 62 at the lower end through wich air passes. When this cleaner is inserted within the hole, the air will blow out any chips, burrs, coolant residual, etc. in order that the hole may be clean before it is checked and prior to installing a tapered fastener.

Figure 6:
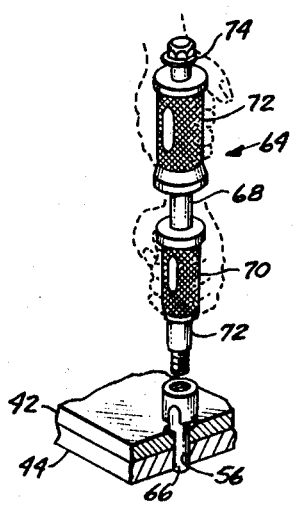
FIG. 6 shows apparatus for the insertion of a gage or probe to determine proper hole configuration of the tapered bolt within the workpieces.

The gage hammer 64 and check pin 66 in FIG. 6 is used to inspect the condition of the tapered hole and to indicate proper bearing. Out of round, bell shaped, or galled holes reduce the bearing area and must be detected. The check pin 66 has a blue dye on its shank which becomes a lighter shade of blue in those areas of the contact of the check pin with the hole wall. An inspection of the pattern on the pin after it has been removed determined the per cent of bearing contact with the hole wall that will occur when a tapered pin of the same configuration will have been inserted. Rifling or irregularities in the hole wall are readily visible on the pattern on the ckeck pin to indicate a failure in inspection. The gage hammer 64 consists of a shaft 68 and a first handle 70 having below it a threaded connection 74 for the attachment of various sizes and shaped of checkpins 66. Mounted for vertical movement on shaft 68 is a second handle 72. An appropriate stop member 74 is at the end of the shaft 68. Handle 72 acts as a ram in which it can be stroked downwardly onto handle 70 as a means of driving checkpin 66 into the hole 56. Conversely, the checkpin 66 may be removed by stroking the handle 72 upwardly against the stop member 74. This gage hammer is the subject matter of copending U.S. Pat. application No. 275,711, filed July 27, 1972, and reference may be had to this application for more detailed information concerning the structure thereof.

Figure 7:
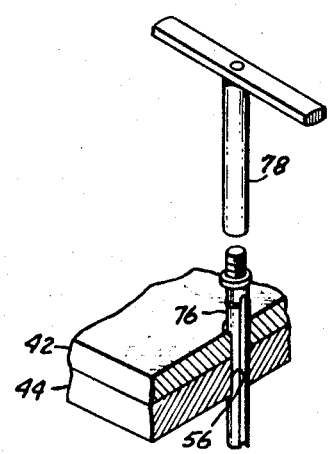
FIG. 7 shows a reamer for the removal or burrs, rifling or metallic fuzz or chips within the hole.

FIG. 7 shows a single flute reamer 76 with a handle 78 attached thereto for rotation within the opening 56 in workpieces 42 and 44. This reamer serves as a burnishing tool and takes any fuzz or minor contaminants out of the hole to insere maximum bearing contact. It also may be used to correct slight irregularity in shape, size, or finish. Various reamers may be used. For example, one with no back rake would be preferable but in the event of rifling or other irregularities a reamer with a better cutting surface would be desirable.

Figure 8:
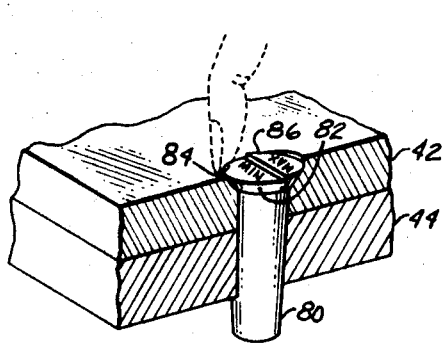
FIG. 8 shows the fingernail test of countersink penetration with a countersink gage.

In FIG. 8 there is shown a countersink depth gage for checking the countersink of tapered fastener holes in inclined surfaces. The two surfaces on the head are for high and low tolerances. This countersink gage consists of a tapered shank 80 with a countersink head 82. This head has a first surface 84 appropriate labeled "max" and a recessed top surface 86 appropriated marked "min." In determining if the countersink is acceptable the gage is inserted with the "max" surface 84 at the low side of the irregular surface of the workpiece 42. If this surface is flush-to-high, the countersink is within the maximum limit. Thereafter, the gage is rotated so that the "min" surface is on the low side and if this surface is flush-to-low, then the countersink is within the minimum limit. The determination of flush-to-low, then the countersink is within the minimum limit. The determination of flush-to-low and flush-to-high may be determined by passing a fingernail over the surface.

Figure 9:
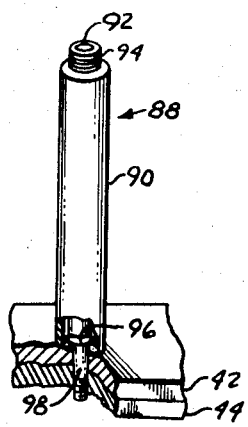
FIGS. 9 and 9a show protrusion gages for panhead bolts and countersink bolts to measure their protrusion above the surface before driving with an impact tool.
Figure 9A:
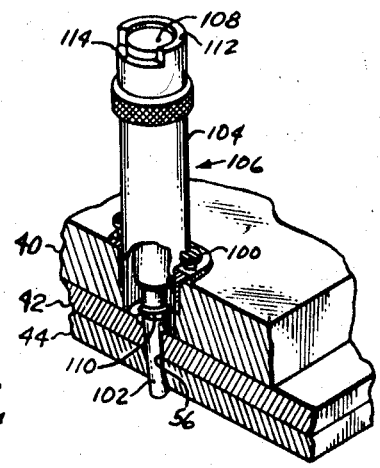

After the hole has passed the countersink test a quick check of the protrusion of the bolt at installation should be made to determine if the tapered hole is drilled to the correct size. The protrusion gages in FIG. 9 and FIG. 9a are for this purpose. These gages are designed to check this protrusion by simply inserting the tapered bolt into the hole with finger pressure and then placing the gage on top of it. The stem at the top of the gage indicates whether or not the bolt is protruding an acceptable table amount. The protrusion gage 88 in FIG. 9 consists of a hollow barrel 90 with a longitudinally movable shaft or stem 92 inside. A plurality of rings 94 on the stem 92 serve as indicating markers to measure how high the head 96 of bolt 98 is above the surface of the upper workpiece 42 when it has been manually pressed into the opening. The protrusion gage in FIG. 9a is used with lock liners 100 in the drill bar 42 when the drill bar 40 remains over the workpiece 42. Here a tapered bolt 102 is passed through the liner 100 and into the opening 56 in workpieces 42 and 44. The outer housing 104 protrusion gage 106 is then inserted into the liner 100 for a reading. The inner shaft 108 is vertically movable and contacts the bolt head 110. The top of shaft 108 will have a vertical height relative to the outermost end 112, or a recessed end 114 of the outer sleeve. If the end of shaft 108 extends above edge 112, then the bolt is too high in the hole meaning the hole is not large enough. If the end of shaft 108 is below edge 114, then the bolt 102 seats too far into the hole meaning that the hole is too large. If the end of shaft 108 is between the two edges, 112 and 114, it indicates that the hole is the right size for that bolt.

Figure 10:
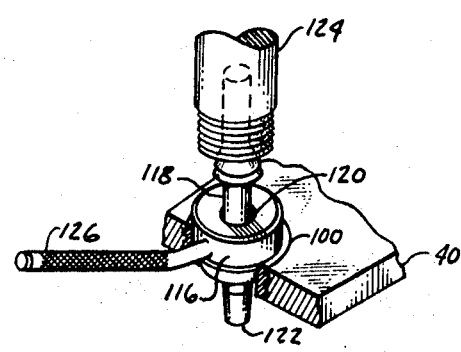
FIG. 10 shows the step of driving the bolt with assistance of a hand-centering guide.

To obtain adequate interference and surface contact, the tapered fastener must be seated firmly in the hole. This is done with the taper lock fastener rivet set assembly in FIG. 10. In this case, the bushing liner 100 in drill bar 40 locates guide 116 precisely over the head of the fastener. A vertically movable anvil 118 within an opening 120 in guide 116 engages the bolt head at the lower end 122 and the upper end 124 of the anvil 118 is contacted by an impact tool 124 to drive the fastener squarely into place without damage to the workpiece itself. Guide handle 126 is conveniently used in handling the assembly.

Figure 11:
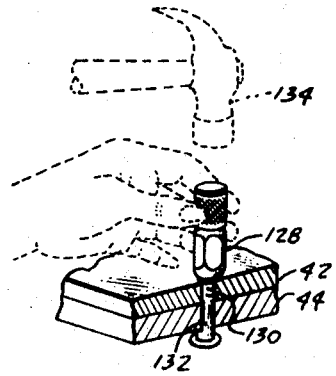
FIG. 11 illustrates the removal of a bolt that has failed inspection.

In the event a tapered bolt should be removed for failure in inspection or for any other reason a knockout tool 128 in FIG. 11 should be used. This tool has a threaded bore which engages the protruding threads 130 of bolt 132 and aligns the tool securely with the bolt. A sharp blow with hammer 134 knocks out the bolt from its hole in workpieces 42, 44 without damage to the thread.

Figure 12:
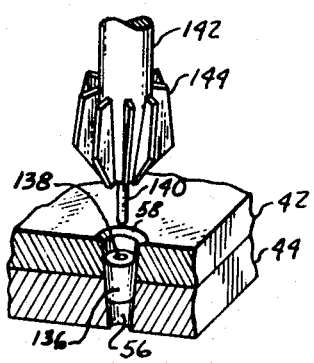
FIG. 12 shows how a hole may be enlarged for use with an oversized bolt.

In the event of drilling or reworking countersink, counterbore or in transferring a larger hole in an upper workpiece to a smaller hole in a lower workpiece, tapered guide bushings such as guide 136 in FIG. 12 is useful. This tapered bushing has a smaller hole 138 to provide a straight concentric pilot hole into which tip 140 of cutter 142 may fit to guide cutter blades 144 in reworking coutnersink 58.

Figure 13:
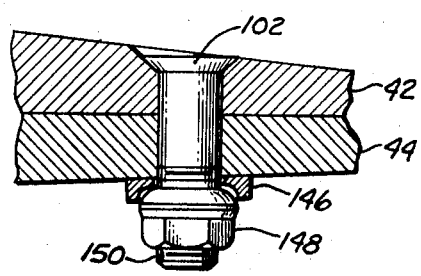
FIG. 13 shows the completed fastener assembly.

FIG. 13 shows the completed assembly including a self-aligning washer 146 and nut 148 torqued onto the threaded end 150 of bolt 102.

Having set forth pictorally the various steps in the installation of tapered fasteners it is to be understood that many of the tools shown were developed espectially for the practice of the present invention. Also the various ones set forth may be necessary and in certain situations some of the steps set forth may be omitted. It therefore is to be understood that this invention is not to be limited to those steps illustrated but to those set forth in the appended claims.

We claim:

1. The method of installing tapered fasteners into tapered holes so that there is an extremely high percent of contact surface, said method comprising the steps of:
   1. determining the low side of the top surface of the workpiece where a tapered hole is to be made, the axis of which is abnormal to the surface,
   2. using a depth sensing device in contact with the low side as a reference and drilling a tapered hole to a predetermined configuration,
   3. cleaning the hole of burrs, chips, coolant residual and other particles,
   4. inspecting the condition of the hole and determining the sufficency of contact surface,
   5. reworking the hole for a better fit if the amount of contact surface is not sufficient,
   6. inserting the fastener under hand pressure into the hole,
   7. driving the fastener firmly into the hole, and
   8. inserting a retaining member onto the fastener to prevent its removal.

2. The method of installing tapered fasteners as set forth in claim 1 wherein a replica of the fastener with a contact marking material on its surface is inserted into the hole and withdrawn, and its surface is inspected to determine the amount of contact surface, and thereafter reworking the hole until sufficient contact is assured before inserting the fastener into the hole.

3. The method of installing fasteners with countersink heads as set forth in claim 1 wherein the depth and angle of the countersink on the top surface of the workpiece is checked before the fastener is inserted into the hole.

4. The method of installing fasteners with countersink heads as in claim 1 wherein the protrusion of the fastener head above the low side of the top surface of the workpiece is checked before driving the fastener firmly into the hole.

5. The method of installing tapered fasteners with countersink heads as set forth in claim 1 wherein a replica of the fastener with a contact marking material on its surface is inserted into the hole, withdrawn and checked to determine the amount of contact surface, and
   wherein the depth and angle of the countersink on the top surface of the workpiece is checked before the fastener is inserted into the hole, and
   wherein the protrusion of the fastener head above the low side of the top surface of the workpiece is checked before driving the fastener firmly into the hole.

* * * * *